US005735122A

United States Patent [19]

Gibbons

[11] Patent Number: 5,735,122

[45] Date of Patent: Apr. 7, 1998

[54] ACTUATOR WITH FAILFIXED ZERO DRIFT

[75] Inventor: Kevin D. Gibbons, Torrington, Conn.

[73] Assignee: United Technologies Corporation, Windsor Locks, Conn.

[21] Appl. No.: 753,800

[22] Filed: Nov. 29, 1996

[51] Int. Cl.[6] .................... F16D 31/02

[52] U.S. Cl. .................... 60/406; 91/44; 91/45; 92/18

[58] Field of Search .................... 91/42, 44, 45; 92/18, 24, 26, 27, 28; 60/406

[56] References Cited

U.S. PATENT DOCUMENTS

| | | | |
|---|---|---|---|
| 3,034,483 | 5/1962 | Rasmussen | 91/44 |
| 3,176,590 | 4/1965 | Uhtenwoldt et al. | 91/44 |
| 3,922,955 | 12/1975 | Kast . | |
| 4,256,017 | 3/1981 | Eastman . | |
| 4,276,809 | 7/1981 | Kast . | |
| 4,375,780 | 3/1983 | Davis . | |
| 4,470,337 | 9/1984 | Kast . | |
| 4,619,188 | 10/1986 | Kimura | 92/27 |
| 4,633,758 | 1/1987 | Kedzierski | 91/44 |

*Primary Examiner*—F. Daniel Lopez

[57] ABSTRACT

The present invention provides an actuator controlled by an electro-hydraulic servovalve with a failfixed operation upon the loss of electrical power to the servovalve. A lock valve has apertures therethrough with friction pads therein for locking the actuator in position upon loss of the electrical power.

9 Claims, 4 Drawing Sheets

ACTUATOR WITH FAILFIXED ZERO DRIFT

BACKGROUND OF THE INVENTION

This invention relates to an electro-hydraulic actuating system, and more particularly, to a failfixed piston device that will failfix the piston upon loss of electrical power to the system, and will have a zero drift rate for an indefinite period of time after having failfixed, and a clamping device for failfixing the piston device.

Actuators and metering devices have been controlled in the past by Electro-Hydraulic ServoValves (EHSV). These EHSV's interact between an electrical control signal and an actuator or metering device. For example, in a fuel metering unit for a jet engine there is an electrical control signal generated by a Full Authority Digital Electronic Control (FADEC) which compares a desired engine speed with an actual engine speed. The generated electrical control signal from the FADEC is connected to an EHSV having a first stage torque motor, or other electro-mechanical device, and a second stage spool, which generally controls a hydraulic piston which in turn controls fuel to the engine. The hydraulic piston is connected to a Linear Variable Differential Transformer (LVDT) or the like, where the LVDT sends a feedback signal or an actual position signal of the piston to the FADEC. Thus, in response to an electrical input signal, an EHSV provides a hydraulic output signal which controls the movement of an actuator piston or metering valve piston which moves in a cylinder to generate a mechanical output signal which varies the position of the mechanical device or mechanical fuel metering valve. The flight characteristic or engine speed can be accurately controlled as a function of the electrical signal generated by FADEC. Upon loss of the electrical signal to the EHSV a hydraulic lock is generated on the second stage spool, which in turn locks the hydraulic piston. It is recognized that a hydraulic lock may be achieved by the second stage spool or by a separate cutoff valve which is activated by the second stage spool. However, the hydraulic lock on the second stage spool has a drift rate associated therewith due to lap leakage effects, i.e. the leakage of hydraulic fluid passed the lands of the second stage spool. Further, the drift rate varies depending on the external load, i.e. the force acting against the hydraulic piston. Thus, the prior art will, upon loss of electrical signal, remain failfixed only for a short period of time, and must be constantly corrected to maintain the position of the second stage spool having the hydraulic lock thereon.

Some prior art failfixing valves use differential current of an input signal to position a spool within a servovalve which in turn allows hydraulic fluids of different pressures to flow through selected ports to opposite ends of a servopiston to position such servopiston and the controlled actuator or the like. However, upon loss of the input signal, the differential current returns to zero, which in turn moves the spool to the median position. Further, although the prior art failfixed servovalve is deemed adequate in many applications, the controlled actuator or metering valve will drift from the locked position after a short period of time because lap leakage effects or because of external loads on the controlled actuator or controlled metering valve, and thus introduce an undesirable condition in the controlled system.

In an attempt to solve this problem, prior art systems have attempted to control the drifting of a lock-in-position servovalve by automatically adjusting the output of a device at a predetermined rate and in a predetermined direction from its failfixed position. However, this approach does not provide the requisite high degree of reliability in emergency situations for aircraft applications, because of the variable causes for the drifting in such emergency situations.

Accordingly, it is an object of the present invention to achieve a zero drift rate for an indefinite period of time in a failfixed electro-hydraulic piston device in the event the electrical input signal to the device is lost.

It is a general object of the present invention to provide a failfixed electro-hydraulic system with a simple mechanical locking clamp, having high reliability and small size, to be used with existing systems, and having excellent long term positive locking ability, which can failfix a piston device.

SUMMARY OF THE INVENTION

To overcome the deficiencies of the prior art and to achieve the desired objects, the present invention provides an electro-hydraulic system with a new and improved failfixed locking means which upon loss of the electrical input signal to the electro-hydraulic system results in the output actuator being locked/fixed in its present desired position.

DETAILED DESCRIPTION OF THE PREFERRED EMBODIMENT

Figure 1:
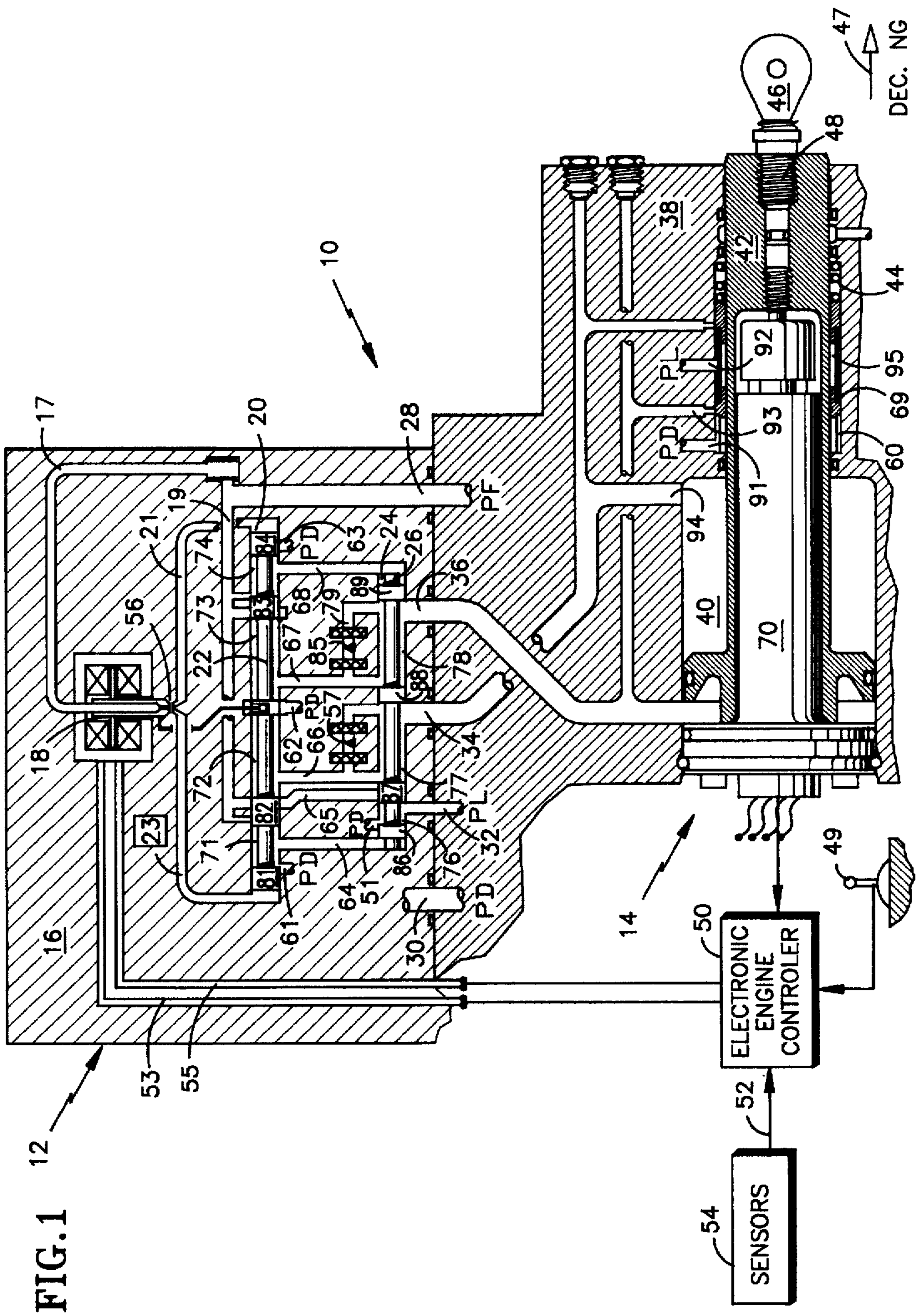
FIG. 1 is an illustration of an actuator control system, partially in cross-section, embodying the present invention.

Referring to FIG. 1 there shown an embodiment of an actuator control system 10 according to the present invention. The actuator control system 10 includes an electro-hydraulic servovalve (EHSV) 12 and an actuator valve 14 operatively associate therewith. The EHSV 12 comprises a housing 16 defining a double acting torque motor 18, a first stage jet pipe 56, a second stage axially translatable spool 22 disposed within a second stage valve chamber 20, a cutoff valve chamber 24, and an axially translatable cutoff spool 26 disposed within a cutoff valve chamber 24. The housing 16 has five fluid lines connecting therethrough, line 28 is connected to an unregulated supply means (not shown) to receive fluid at a supply pressure (PF), fluid line 30 is connected to a drain reservoir (not shown) which is maintained at a generally constant drain pressure (PD) which is at a pressure less than the supply pressure, fluid line 32 is connected to lock valve 69 at a desired pressure which can be either PF or PD, and drain lines 34, 36 are connected in fluid communication with the second stage valve chamber 20 to provide a desired fluid pressure to the actuator valve 14.

Actuator valve 14 comprises a housing 38 defining a valve chamber 40, an axially translatable spool 42 disposed within the valve chamber 40, and a bias spring assembly 44 disposed within the valve chamber 40 in operative association with a failfixed locking valve 69. The spool 42 has an eyelet 46 attached thereto, e.g. by way of the thread means 48, which may be utilized on an aircraft (not shown), and more specifically in conjunction with the control of various mechanical variables associated with a jet aircraft engine, e.g. jet engine vanes.

The actuator control system 10 further includes an electronic engine control device (EEC) 50 that is responsive to signals on line 52 from sensors 54 located on the jet engine and on the air frame e.g. power lever position and engine temperature. The sensors 54 sense various jet engine parameters such as engine speed, and the EEC 50 is responsive, in part, to the signals 52 to control the movement of the vanes connected to the eyelet 46.

The flow of fluid through the second stage valve chamber 20 and the cutoff valve chamber 24 depends upon the position of the axially translatable spools 22 and 26, respectively. More specifically, the fluid flowing through the second stage and cutoff valve chambers 20, 24 depends upon the position of the "lands" and "metering windows" on the spool members with respect to the supply and drain lines connected in the fluid communication therewith. The "lands" define circumferentially extending portions 81, 82, 83, 84 of the axially translatable second stage spool 22, and portions 86, 87, 88, 89 of axially translatable cutoff spool 26. The EEC device 50 provides electrical signals through electrical lines 53, 55 to the double acting torque motor 18. The double acting torque motor 18 magnetically deflects a first stage flexible jet pipe 56 to direct hydraulic fluid PF through hydraulic lines 21, 23 to both ends of the axially translatable second stage spool 22 in the second stage valve chamber 20. The axially translatable spool 22 moves in either of two directions, depending upon the pressure differential of the hydraulic fluid applied to the ends of the axially translatable spool The axially translatable spool 22 allows hydraulic fluid to flow either through the drain lines 61, 62, 63 and then through the fluid line 30, or through the pressure supply lines 64, 65, 66, 67, 68 which supply high pressure fluid PF to the cutoff valve chamber 24. The axially translatable spool 22 also allows hydraulic fluid to flow from pressure supply lines 64, 65, 66, 67, 68 to both ends of the spool 26, to the fluid line 32, and to fluid lines 34, 36 through annuluses 77, 78. The spool 26 also allows fluid to flow from PL fluid line 32 to PD drain line 51.

Figure 3:
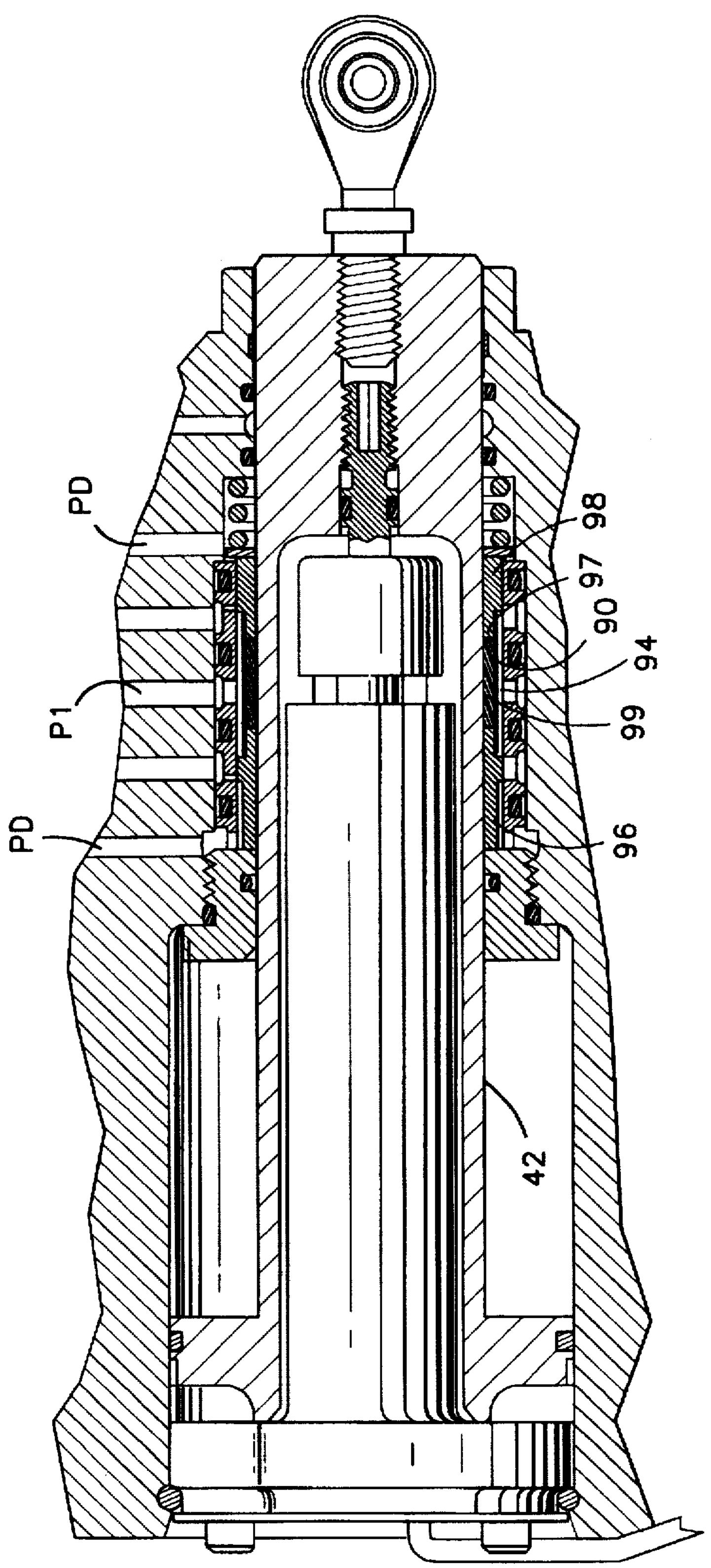
FIG. 3 is an enlarged cross-sectional view of a hydraulic locking clamp of the present invention.

The actuator valve 14 has a linear variable displacement transducer (LVDT) 70 extending axially through a portion of the spool 42 in the valve Chamber 40. The LVDT 70 transmits signals to the EEC device 50 indicative of the actual position of the spool 42 in the valve chamber 40. Signals from the EEC 50 are coupled to the double acting torque motor 18 to control the torque motor in order to drive the flexible jet pipe 56, and in turn adjust the pressure differential between ends of the axially adjustable spool 22, so as to control the axial position of the spool 42. The actuator valve housing 38 defines the valve chamber 40 and the failfixed chamber 60. The failfixed chamber 60 defines a circumferentially extending annular chamber disposed between the housing 38 and the spool 42, and failfixed locking valve 69 and the bias spring assembly 44 are disposed therein. The failfixed chamber 60 has four fluid ports opening through its wall; port 91 which is connected in fluid communication through the fluid drain line 30 to the low pressure drain, port 92 which is connected in fluid communication through a fluid lock valve line 32 to annulus 76 at either PD or PF, port 93 which is connected in fluid communication through the fluid line 36 to annulus 78 and port 94 which is connected in fluid communication through fluid line 34 to annulus 77. The failfixed locking valve 69 defines a cylindrical locking piston or sleeve 96 which is circumferentially spaced from the spool 42 so that in normal operation the spool 42 slides freely through the locking piston or sleeve 96. The cylindrical locking piston 96, as shown in detail in FIG. 3, has a plurality of apertures 97 through the sidewall 98 and spaced around the periphery of the sleeve with each aperture 97 having a friction pad 99 disposed therein. The friction pad 99 may be a thermoplastic material, e.g. peek or Vespel (Registered Trademark of DuPont). The friction pad 99 moves radially in the aperture 97 to apply a clamping force to the spool. The outer portion of the sidewall 98 has a circumferential groove extending axially beyond each aperture 97 with a flexible bladder-like member 90 secured in the groove 94. The bladder 90 which may be an elastic material, e.g. Viton, is in contact with the friction pad 99 on one side and in fluid communication with either PD or PL on the opposite side. The bladder prevents hydraulic fluid from flowing through the apertures 97 to the spool 42, and transmits a clamping pressure from PL to the friction pads 99 for clamping the spool 42 against movement.

During normal operation of the above-described actuator control system 10, axially translatable spool 26 is in the leftward position as shown in FIG. 1, and supply fluid PF enters the fluid line 28 and flows into either or both the supply line 17 of the flexible jet pipe 56, and/or the supply line 19 of the second stage valve chamber 20. The position of the axially translatable spool 22 is controlled by the EEC 50, based on the signal transmitted by the LVDT 70 which is indicative of the actual position of the actuator spool 42. The EEC 50 is responsive to the actual and desired position signals transmitted to control the double acting torque motor 18 in order to adjust the flexible jet pipe 56. Movement of the jet pipe 56 adjusts the differential pressure between a first inlet end line 21 and a second inlet end line 23 in order to control the position of the axially translatable spool member 22, and thus control the flow of hydraulic fluid through the cutoff valve chamber 24 and to the valve chamber 40 of the actuator valve 14. If, for example, the actuator valve 14 controls jet engine vanes (not shown) which are connected to the eyelet 46, and it is desired to open or close the vanes as engine speed changes it is necessary to move the spool 42 and the eyelet 46 attached to the vanes. As engine speed decreases, for example, EEC 50 transmits a desired signal to the double acting torque motor 18 to move the flexible jet pipe 56 to the left as shown to increase the flow of the supply pressure PF in the second inlet end line 23 which in turn shuttles the first stage axially translatable spool 22 to the right. As the second stage axially translatable spool 22 moves to the right, the center drain line 62 opens to drain hydraulic fluid from the right side of valve chamber 40 through fluid line 34, annulus 77, bypass line 75, and annulus 72, while supply pressure is supplied to the left portion of valve chamber 40 through fluid line 36, annulus 78, bypass line 79, annulus 73, and supply line 19 thereby moving the spool 42 and the eyelet 46 to the right as shown by the arrow 47 to a decreased engine speed position.

Figure 4:
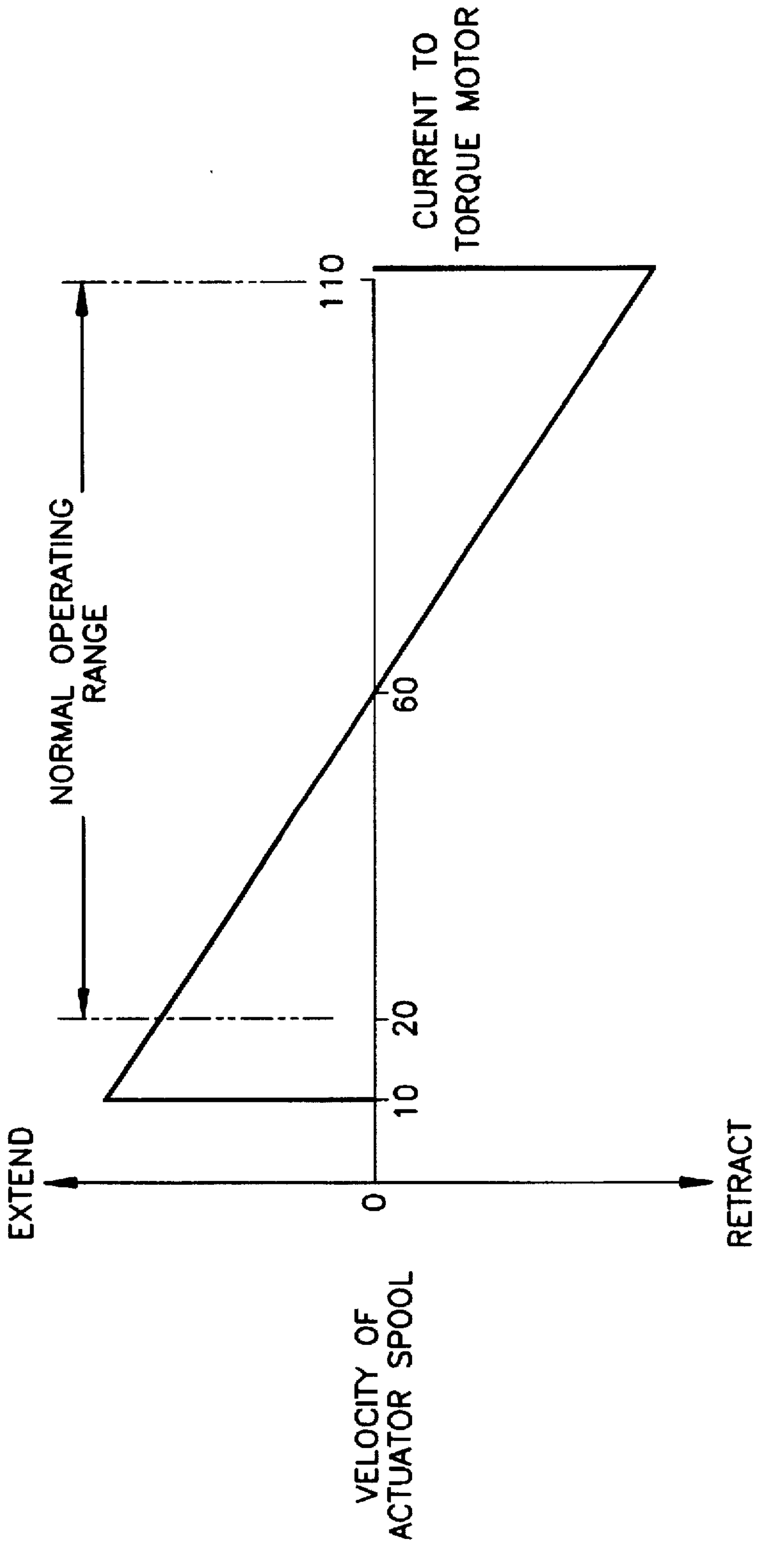
FIG. 4 is a graphical representation of the characteristic curve of the velocity of the; spool of the present invention as a function of the current applied to a torque motor.

As shown in the characteristic curve of FIG. 4, the range of control current from EEC 50 to the double acting torque motor 18 is entirely positive never passing through zero current. Further, as shown in FIG. 1, the position of axially translatable spool 22 is proportional to the current of the double acting torque motor 18 and in turn, as previously described, the size of the openings from drain line 62 to the right side of valve chamber 40 and from supply line 19 to the left side of chamber 40 would be proportional to the position of axially translatable spool 22 if the actuator spool 42 is moving to the right. Therefore, the velocity of the actuator spool 42 is proportional to the current supplied to torque motor 18. The normal operating range is greater than 0 ma current, thereby resulting in axially translatable spool 22 having a unique 0 ma position outside the normal operating range. Upon loss of the electrical signal to the EHSV, and more particularly the double acting torque motor 18, the jet pipe 56 moves to the left whereby supply pressure PF flows through second inlet end line 23 to the left end of axially translatable spool 22 to move the spool 22 to the right. As the axially translatable spool 22 shuttles to the right in the second stage valve chamber 20 the drain line 61 is covered by land 81 and land 82 moves away from the port for pressure supply line 65, and the left end of the axially translatable spool 26 is in communication with supply pressure PF through hydraulic line 64, annulus 71, supply line 19 and fluid supply line 28, while the drain line 63 is uncovered from land 84 and opens so the pressure on the right end of axially translatable spool 26 flows through hydraulic line 68 to drain line 63. At the same time, supply pressure PF is ported in annulus 73 and annulus 72 to low pressure drain Pd. When the axially translatable cutoff spool 26 moves to the right, land 87 cuts off flow between line 66 and line 34. Also, land 88 cuts off flow between line 67 and line 36. This hydraulically locks spool 42 and stops its motion. A small amount of fluid flows from annulus 73 through orifice 85 in line 79 to line 36 and to the left side of valve chamber 40. Also, a small amount of fluid flows from the right side of valve chamber 40 through line 34 and through the orifice 57 in line 75 to annulus 72. In this manner the actuator spool 42 slowly drifts to the right. The lock valve fluid line 32 is switched from the low pressure drain PD at line 51 to the high pressure supply PF through hydraulic line 65, annulus 71, supply line 19 and fluid supply line PF The high supply pressure in lock valve fluid line 32 is ported to the failfixed locking valve 69 through port PL 92 which causes the thermal plastic friction pad 95 to be forced against the spool 42 thereby achieving a friction lock on the spool 42. As previously described, the spool 42 is now drifting to the right. The failfixed locking valve 69, being friction locked to spool 42, moves with spool 42. As failfixed locking valve 69 moves it opens a fluid flow path from the left side of valve chamber 40 to the low pressure drain in line 91. Also, a fluid flow path is opened from what is now supply pressure PF in line 92 to the right side of valve chamber 40. The actuator spool 42 will drift to the right until two openings just described are equal to the orifices 57 and 85. At this point an equalization is achieved between the flow from annulus to the left side of valve chamber 40 and the flow from valve chamber 40 to line 91. Also, an equalization of flow is achieved between the flow from line 92 to the right side of valve chamber 40 and the flow from valve chamber 40 to annulus 72. This would be referred to as a hydraulic null. In this manner the rightward drift of actuator spool 42 stops and will remain stopped for an indefinite period of time.

Figure 2:
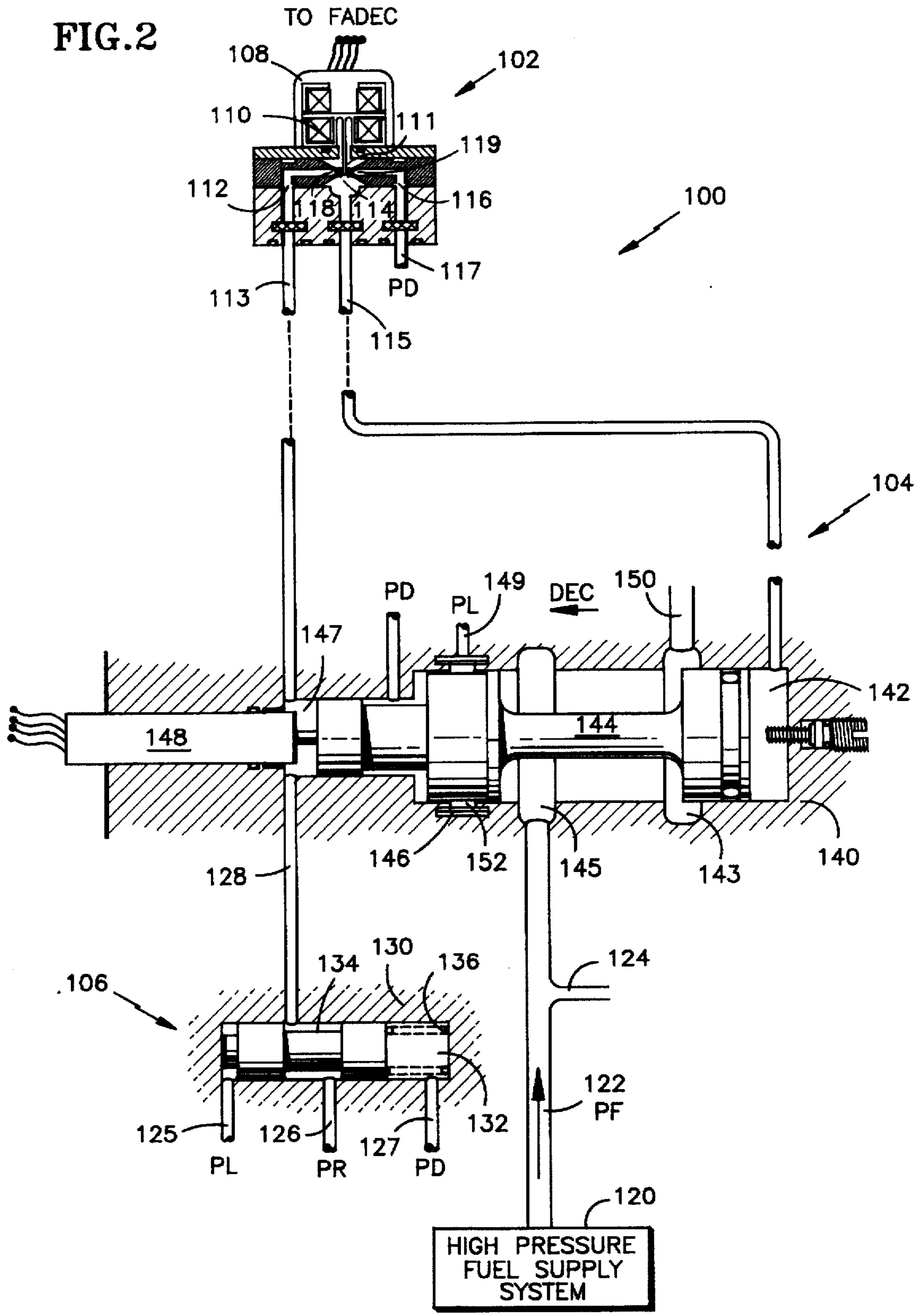
FIG. 2 is an illustration of a fuel metering system, partially in cross-section, embodying the present invention.

Referring now to FIG. 2 there is shown an embodiment of a fuel metering unit (FMU) 100 according to the present invention. The FMU 100 includes a double-acting torque motor 102, a single stage metering valve 104, and a fluid cut-off valve 106 operatively associated each with the other. The torque motor 102, known to those skilled in the art, comprises a bi-polar input current device 108, a flapper system 110 and a plurality of fluid ports 112, 114, 116. The bi-polar input current device moves the flapper system 110 in one direction when positive current is applied to its coils and moves it in the opposite direction when negative current is applied. The fluid ports 112, 114, 116 are in fluid communication with regulated servo supply pressure (PR) line 113, flapper modulated pressure (PM) line 115, and drain pressure (PD) line 117, respectively.

A high pressure filtered fuel supply system 120 is coupled in fluid communication with the metering valve 104 through filtered high pressure (PF) fuel line 122, and with various servo-driven components through fuel line 124 in order to provide a filtered relatively high pressure source of fuel to these components. The fuel line 124 is connected in fluid communication through a pressure regulating valve, of a type known to those skilled in the art (not shown) which supplies regulated pressure (PR) fuel to inlet port 126 of the fluid cut off valve 106. The fluid cut off valve 106 comprises a housing 130 defining cut off valve chamber 132, a regulated pressure cut off valve axially translatable spool 134 disposed within the cut off valve chamber 132 and a spring bias assembly 136 operatively connected to the PR spool 134. The housing 130 has four fluid lines connecting therethrough, the PR inlet port 126, a PD drain line 127 connected to a drain reservoir (not shown), a PL locking line 125 connected to a lock valve (e.g. fluid line 32) at a desired pressure which can be either PF or PD, and PR outlet line 128.

The axially translatable PR cutoff valve spool 134 is normally biased in one direction by the spring bias assembly 136 and can be moved in the other direction when the pressure in the PL locking line 125 is switched to high pressure PF.

Metering valve 104 comprises a housing 140 defining a metering valve chamber 142, and axially translatable spool 144 disposed within the metering valve chamber 142, a failfixed locking valve 146 in operative association with the axially translatable metering spool 144, and a linear variable displacement transducer (LVDT) 148 operatively connected to the axially translatable metering spool 144 for providing electronic signals to the EEC 50 indicative of the actual position of the axially translatable metering spool 144 in the metering valve chamber 142. The axially translatable metering spool 144 moves in either of two directions, depending upon the pressure differential of the fuel applied to the ends of the axially translatable metering spool 144. The axially translatable metering spool 144 controls the amount of fuel flowing through the high pressure (PS) fuel line 122 through a portion of the window 143 through pilot line 150 which supplies fuel to a set of pilot nozzles (not shown).

During normal operation of the above-described FMU 100 fuel is supplied from the high-pressure fuel system 120 to the annular recess 145 through the metering window 143 and coupled in fluid communication with the pilot line 150. The position of the axially translatable metering spool 144 within the metering valve chamber 142, which controls the amount of fuel flowing in the pilot line 150, is controlled by fluid flow into or out of metering valve chamber 142, via line 117. The regulated servo supply pressure PR flows through the fluid cut off valve 106, PR outlet line 128, through half area metering valve chamber 147 and is supplied to the double acting torque motor 102 through regulated servo supply pressure PR line 113. The flapper system 110 normally maintains an equal opening between lines 113, 117, and 116 such that flow in line 113 equals flow in line 116, and there is zero net flow in line 117. This is the null position of the flapper system 110, and corresponding to zero torque motor current. In the present embodiment, the axially translatable metering spool 144 is constructed in such a predetermined manner that the spool face area on the PR left side as shown) side is one half of the spool area on the PM side (right side as shown). Thus, when the PM is equal to one half of PR the axially translatable metering spool 114 will be balanced, but as PM increases greater than one half PR then the axially translatable metering spool 144 will move to the left (as shown in FIG. 2). Due to the characteristic of the bi-polar input current device 108, and because the deflecting flapper means 111 is normally in the mid position with respect to nozzle 118 and nozzle 119. The axially translatable metering valve spool is normally balanced and not moving. If, however, an increase in fuel is desired a control signal is sent to the double acting torque motor 112 to increase the current in the positive direction which will move the deflecting flapper means 111 away from nozzle 119 and toward nozzle 118 closing off PR fluid flow from line 113 thus decreasing the fluid pressure PM in fluid line 117 thereby decreasing the pressure against the right side of axially translatable metering spool 144 thereby shuttling said spool to the right and increasing fuel flow through pilot line 150.

However, upon loss of the electrical signal to the double acting torque motor 102., the flapper system 110 moves to its "null" position as described above and the pressure in PL locking line 125 changes to high pressure fluid, e.g. PL pressure coming from the EHSV 12 as previously described, and moves the axially translatable regulator pressure cut off valve spool 134 to the right. Spool 134 cuts off PR flow through line 113 and this causes all pressures in double acting torque motor system 102 and metering valve 104 to drop to PD, except in PL fluid line 149. The pressure in lines 113 and 117, and valve chambers 147 and 142 decrease to PD, thereby equalizing such pressures, and in this manner, any pressure load tending to move spool 44 is eliminated. Also, the failfixed locking valve 146 has high pressure fluid applied through the PL fluid line 149 which causes the thermal plastic friction pad 152 to be forced against the axially translatable metering spool 144 thereby achieving a friction lock on the spool 144 and holding it satirically positioned against external vibratory loads.

I claim:

1. In an actuator for positioning a device having a piston movable in a bore and an electrohydraulic servovalve for controlling a first pressure signal to a first end of the piston and a second pressure signal to a second end of the piston to move the piston in response to an electrical signal, an improved failfixed valve for maintaining the piston in a fixed position upon failure of the electrical signal comprising:

sleeve means disposed in close fitting relation around a portion of the piston, said sleeve means having an aperture means therethrough disposed circumferentially thereabout;

friction pad means adapted to be received in said aperture means, said friction pad means radially movable in said aperture means;

a flexible sleeve means surrounding a portion of said sleeve means, said flexible sleeve means disposed in close fitting relation with said friction pad means; and valve means in fluid communication with the first and the second end of the piston for receiving the first and the second pressure signals, said valve means operative upon failure of the electrical signal to supply a locking pressure to said flexible sleeve means whereby said flexible sleeve means transmits said locking pressure to said friction pad means to force said friction pad means against the piston such that said friction pad means and said sleeve means move with the piston and such that said valve means controls the first and the second pressure signals in response to movement of said friction pad means and said sleeve means so that the piston is clamped in a fixed position.

2. The failfixed valve improvement as set forth in claim 1 wherein said valve means comprises:

a first stage valve adapted to receive the electrical signal whereby the position of said first stage valve is proportional to the electrical signal received thereby and said first stage valve produces a variable fluid pressure output in response to the electrical signal;

a second stage valve in communication with the variable fluid pressure output of said first stage valve for providing a third and fourth pressure signal; and a cutoff valve responsive to said third and fourth pressure signals for providing said locking pressure to said friction pad means and for providing the first and second pressure signals.

3. The failfixed valve improvement as set forth in claim 2 wherein said first stage valve is a double acting torque motor valve.

4. The failfixed valve improvement as set forth in claim 1 wherein said sleeve means has a circumferential groove therein and extending axially beyond said aperture means for securing said flexible sleeve means in said groove against axial movement.

5. The failfixed valve improvement as set forth in claim 1 wherein said locking pressure goes from a low pressure to high pressure upon loss of the electrical signal.

6. The failfixed valve improvement as set forth in claim 1 further comprising a sidewall means for limiting the travel of said sleeve means and said friction pad means when said sleeve means and said friction pad means are forced against the piston by said locking pressure, wherein said sidewall means is disposed around a portion of the piston, said sidewall means having an aperture disposed therethrough for receiving said sleeve means.

7. A clamping apparatus for clamping a movable piston against movement within a bore, wherein the piston receives a first pressure signal at a first end and a second pressure signal at a second end to control movement of the movable piston, the clamping apparatus comprising:

a body means having a wall member adapted to surround a portion of the movable piston, said body means having aperture means through said wall member;

friction pad means adapted to be received in said aperture means, said friction pad means radially movable in said aperture means; and a flexible sleeve means adapted to surround a portion of said wall member and disposed in contacting relation with said friction pad means, said flexible sleeve means adapted to receive a clamping pressure exerted by an external force and to transmit said clamping pressure to said friction pad means to press said friction pad means against the movable piston for movement with the moveable piston; and a control valve means in fluid communication with the first and the second end of the piston for receipt of the first and second pressure signals, said control valve means varying the first and second pressure signals in response to movement of said friction pad means to prevent the movable piston from moving.

8. A clamping apparatus as set forth in claim 7 wherein said flexible sleeve means is an elastomeric material.

9. A clamping apparatus as set forth in claim 8 wherein said wall member has a circumferential groove therein extending axially beyond said aperture means for securing said flexible sleeve means in said circumferential groove against axial movement.

* * * * *